United States Patent [19]

Kingery et al.

[11] Patent Number: 5,046,352

[45] Date of Patent: Sep. 10, 1991

[54] DISPLACEMENT CUBE CALIBRATOR DEVICE

[75] Inventors: Charles N. Kingery, Aberdeen; Edmund J. Gion, Havre de Grace, both of Md.

[73] Assignee: The United States of America as represented by the Secretary of the Army, Washington, D.C.

[21] Appl. No.: 464,061

[22] Filed: Jan. 10, 1990

[51] Int. Cl.$^5$ .............................................. G01L 27/00
[52] U.S. Cl. ......................................... 73/4 R; 73/12
[58] Field of Search ...................... 73/1 R, 3, 4 R, 11, 73/12, 35, 147, 1 B, 1 D, 865.6

[56] References Cited

U.S. PATENT DOCUMENTS

| | | | |
|---|---|---|---|
| 3,664,176 | 5/1972 | Margleburg | 73/4 R |
| 4,479,378 | 10/1984 | Malakhoff | 73/865.6 |
| 4,495,809 | 1/1985 | Higginbottom et al. | 73/865.6 |
| 4,528,999 | 7/1985 | Tonellato | 137/511 X |
| 4,534,216 | 8/1985 | Fasano et al. | 73/865.6 X |

OTHER PUBLICATIONS

BRL Technical Report TR-3015 by Charles N. Kingery and Edmund J. Gion entitled "Jet-Flow from Shock Tubes", dated Jul. 1989, pp. i-viii & 1-44.

*Primary Examiner*—Tom Noland
*Attorney, Agent, or Firm*—Saul Elbaum; Paul S. Clohan; Muzio B. Roberto

[57] ABSTRACT

A device for calibrating cubes which are used in the determination of the magnitude and pressure of an air blast having a base, a pedestal mounted on the base, a pendulum pivotally attached near the top of the pedestal, a box end for holding the cube at the end of the pendulum, a timing device for determining the velocity of the pendulum during its swing, and a bumper for stopping the pendulum when the pendulum is vertical so as to impart an initial velocity of Vo to the cube whereby the calibration factor of the cube can be determined. Another embodiment provides a metallic block instead of the box end in which case the cube is struck by the block end of the pendulum thus imparting initial velocity Vo.

9 Claims, 2 Drawing Sheets

DISPLACEMENT CUBE CALIBRATOR DEVICE

RIGHTS OF THE GOVERNMENT

The invention described herein may be manufactured, used and licensed by or for the United States Government for Governmental purposes without payment to us of any royalty thereon.

BACKGROUND OF THE INVENTION

The present invention is related to the measurement and characterization of the flow effects and dynamic pressure impulse generated by an explosive airblast.

It is well known in the art that the initiation of an explosion at ground level will cause significant particle flow and dynamic pressure outward from the blast center. Several methods are currently in use to measure the magnitude of the blast, both in terms of velocity of the airflow and dynamic pressure at any given point radially outward from the blast center. One such method is to place numerous pressure transducers at given points along the blast path in order to measure the dynamic pressure at these points. This method is not only time consuming but very costly as a large quantity of transducers are necessary to properly characterize any given blast. A better method is to use displacement cubes to measure the effects of a blast. In this method, small cubes of material, generally metallic, and on the order of one cubic inch in volume, are placed along the blast path, and their displacement, after the blast, is measured. The dynamic pressure impulse of the blast can then be calculated according to the following equation:

$$I = \frac{mV_o}{C_d A}$$

Where:
I = dynamic pressure impulse of the blast
m = mass of the displacement cube
$C_d$ = coefficient of drag of the displacement cube
$V_o$ = initial velocity of the displacement cube
A = frontal area of the displacement cube From the above equation it can be seen that to derive the dynamic pressure impulse of the blast from cube displacement, the initial velocity "$V_o$" of the displacement cube must be determined. From experimental trials it was observed that a relationship exists between the initial velocity "$V_o$" of the cube and the resulting displacement "D" of the cube. To verify that such a relationship exists, tests were conducted in which a metallic cube was launched over a hard-packed earth surface at different velocities and the displacements from the points of launch were measured. The cube was suspended about two inches above the surface on a fixture attached to the rear of a truck. The cube was held in this position until the truck was traveling at a selected speed, and then the cube was dropped. At speeds above 18 miles per hour, the speed of the truck was measured by a radar gun. Below 18 miles per hour, the speedometer of the truck was used.

Cube displacements were measured from the point of first contact with the ground to its final resting position. The orientation of the cube was uncontrolled after release, and could change somewhat during the two-inch fall, whereas cubes used in blast tests are initially on the ground with a face normal to the radial blast from ground zero. However, for displacements larger than around six feet, the effect of the differences in initial conditions is generally very small.

A mathematical model for the movement of a cube launched with an initial velocity "$V_o$" can be constructed by assuming that the resistance to movement is a constant determined by the cube weight times a resistance coefficient, and results in the equation:

$$m \frac{d^2 x}{dt^2} = -\mu m g$$

where
x = displacement
t = time
m = mass of the cube
$\mu$ = resistance coefficient
g = acceleration due to gravity For this model, the total displacement of the cube is given by the following equation:

$$D = \frac{V_o^2}{2\mu g}$$

where
D = total displacement
$V_o$ = initial velocity

This result indicates that if the model is adequate, the ratio $D/V_o^2$ should be constant, i.e. $D/V_o^2 = C$ where "C" is a constant. Experimental data indicates that this is the case. Given this relationship, $V_o$ can now be expressed in terms of the constant "C" and cube displacement "D", thus, in the dynamic pressure impulse equation, $V_o$ can be replaced by the square root of D/C and the equation becomes:

$$I = \frac{m}{C_d A} \sqrt{\frac{D}{C}} = \frac{w}{C_d A g} \sqrt{\frac{D}{C}}$$

where
w = the weight of the cube.

From the above equation it can be seen that if "C" can be determined by calibration of the particular displacement cube to be used, determination of the dynamic pressure impulse "I" becomes a matter of routine calculation. The difficult part then is the calibration of the displacement cube. The present invention will overcome the drawbacks of the prior art method of displacement cube calibration. One significant drawback in the prior art was that accurate determination of the initial velocity "$V_o$" of the cube was difficult. "$V_o$" was first read in miles-per-hour from the vehicle's speedometer and then converted to feet-per-second, a cumbersome and error prone technique. A second drawback in the prior art method is the time required for each change in a velocity run. A third drawback in the prior art is the limited selection of surfaces over which the calibration can be done.

OBJECTS AND SUMMARY OF THE INVENTION

The object of this invention is to provide an improved method for the determination of the calibration factor of a displacement cube.

The present invention provides an improved device for imparting an initial velocity "$V_o$" to a displacement cube during calibration. A sample cube is placed in a carrier at the end of a pendulum, and the pendulum is raised to a predetermined height. The pendulum is released and allowed to swing free until stopped at a position when the pendulum is vertical. The velocity of the pendulum just prior to being stopped is measured by a timing device such as an electronic counter or high speed film. The sample cube leaves the carrier and will travel along a horizontal surface at an initial velocity which will be equal to the final velocity of the pendulum. An alternate embodiment provides a pendulum with a steel block in place of a carrier which strikes a resting cube to impart an initial velocity. In this embodiment, the pendulum is not stopped but allowed to swing free. The device can be transported to an area where the cubes are being used as gages and the calibration can be done on site over the same terrain as the test area, thus providing improved reliability and accuracy over the prior art method.

DETAILED DESCRIPTION OF THE PREFERRED EMBODIMENTS

Figure 1:
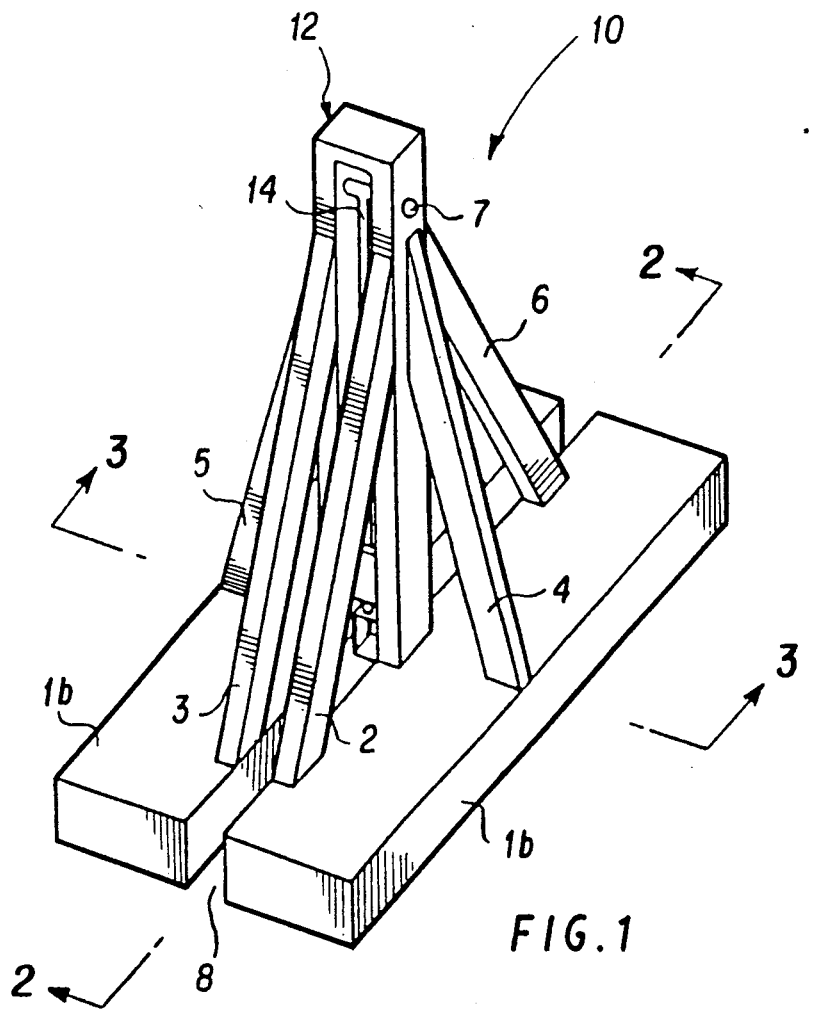
FIG. 1 is an isometric view of an embodiment according to the present invention.
Figure 2:
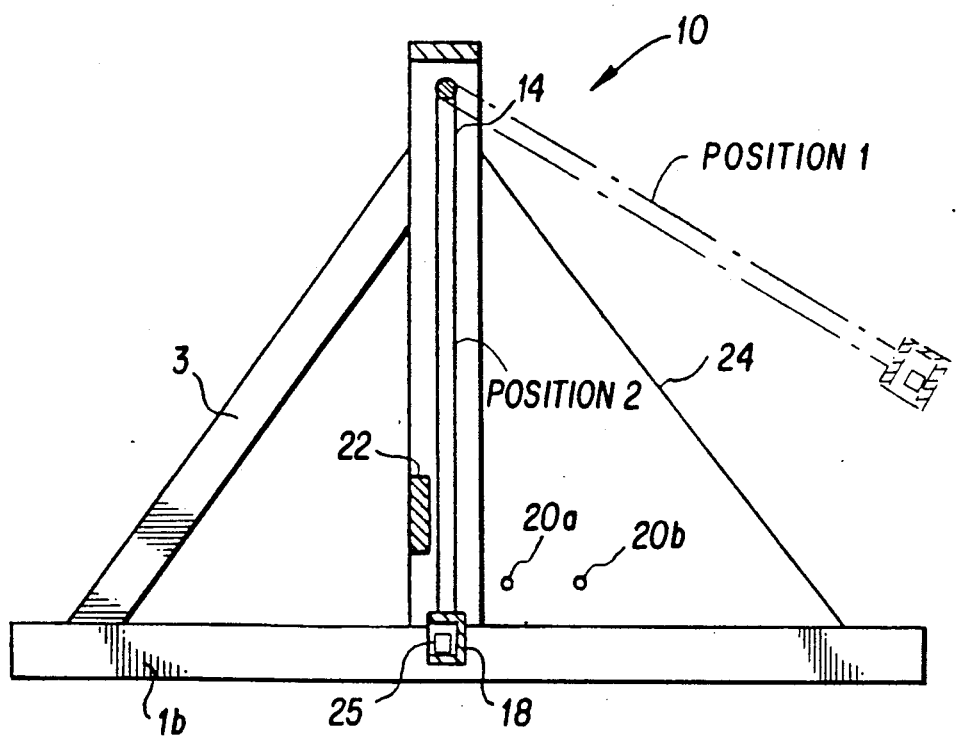
FIG. 2 is a sectional view along line 2—2 of FIG. 1.
Figure 3:
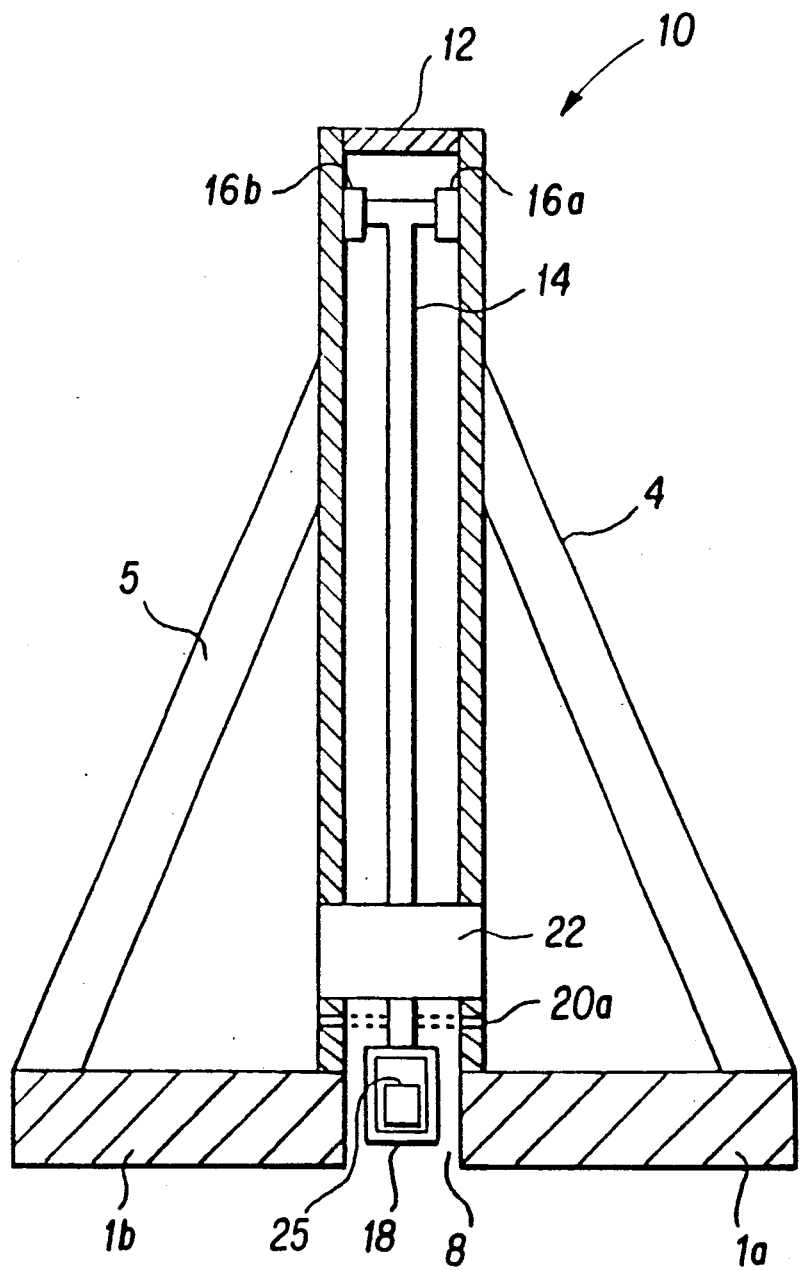
FIG. 3 is a sectional view along line 3—3 of FIG. 1.

Referring now to FIG. 1, a Displacement Cube Calibrator Device according to the present invention is shown generally by the numeral 10. Device 10 consists of right base 1a, left base 1b, and pedestal 12. Located within pedestal 12 is pendulum 14 which is supported at and pivots about pivot point 7. Pedestal 12 is braced against forward movement by right front brace 2 and left front brace 3; against sideways movement by right center brace 4 and left center brace 5; and against rearward movement by right rear brace 6, and left rear brace 24 (shown on FIG. 2). In FIG. 3, it can be seen that pendulum 14 is attached to pedestal 12 at pivot point 7 by bearings 16a and 16b which are mounted near the top of pedestal 12. At the end of pendulum 14 is attached carrier box 18, in which a displacement cube 25 to undergo calibration is placed. To impart an initial velocity $V_o$ to displacement cube 25 undergoing calibration, pendulum 14 is manually raised rearward to position 1 with displacement cube 25 within carrier box 18. Pendulum 14 is then released and stopped at position 2 (vertical) by bumper stop 22 (shown in FIGS. 2 and 3); i.e., when pendulum 14 and carrier box 18 are tangent to the horizontal surface upon which displacement cube calibrator device 10 is placed. An alternate method of imparting velocity $V_o$ to cube 25 is to place displacement cube 25 on the horizontal surface between right base 1a and left base 1b and then strike it with the end pendulum 14. In that case, carrier box 18 is replaced with a solid metallic block which can be made from steel or other suitable metals. The metallic block will then strike the displacement cube, imparting an initial velocity $V_o$. In this case, bumper stop 22 is not needed, as it is unnecessary to stop pendulum 14 at position 2.

To determine the velocity of carrier box 18 at position 2, i.e., at the time of release of displacement cube 25, photo diodes are placed at points 20a and 20b on left rear brace 24. As carrier box 18 passes by the photo diode located at position 20b, it interrupts a first light beam directed at a photo diode located at position 20b and a signal is generated to start an electronic counter. When carrier box 18 passes position 20a it interrupts a second light beam directed at the photo diode located at position 20a, which is a known distance from point 20b, and another signal is generated to stop the counter. Because the distance between points 20a and 20b is known, and the time that it took for carrier box 18 to travel this distance is known, the velocity of carrier box 18 can be calculated. This velocity will be the velocity "$V_o$" at which cube 25 is released when pendulum 14 is stopped at position 2. An alternate method of interrupting the timing circuit would be the use of a brittle lead, such as used in pencils, at points 20a and 20b. When carrier box 18 strikes the lead it will shatter and interrupt the circuit. Magnetic pickups could also be used to start and stop the counter and record the time lapse.

To those skilled in the art, many modifications and variations of the present invention are possible in light of the above teachings. It is therefore to be understood that the present invention can be practiced otherwise than as specifically described herein and still will be within the spirit and scope of the appended claims.

We claim:

1. A device for calibrating cubes which are used in the determination of the magnitude and dynamic pressure of an air blast comprising:
   a base;
   a pedestal mounted on said base;
   a pendulum having a first end and a second end, said pendulum pivotally attached at the first end near a top of said pedestal;
   means located at the second end of said pendulum for releaseably holding said cube;
   means for determining the velocity during the swing of said pendulum;
   means for stopping the swing of said pendulum when said pendulum is vertical so as to impart an initial velocity of $V_o$ to said cube.

2. The device of claim 1 further comprising a plurality of braces fixedly attached between said pedestal and said base.

3. The device of claim 1 wherein said base is comprised of a left base, a right base, and a longitudinal slot disposed between said left base and said right base.

4. The device of claim 1 wherein said means for releaseably holding said cube at the second end of said pendulum is a carrier box.

5. The device of claim 1 wherein said means for stopping said pendulum when said pendulum is vertical is a bumper stop located near a bottom end of said pedestal.

6. A device for calibrating cubes which are used in the determination of the magnitude and dynamic pressure of an air blast comprising:
   a base;
   a pedestal mounted on said base;
   a pendulum having a first end and a second end, said pendulum pivotally attached at the first end near a top of said pedestal;
   a solid metallic block affixed at the second end of said pendulum;
   means for determining the velocity during the swing of said pendulum.

7. The device of claim 6 further comprising a plurality of braces fixedly attached between said pedestal and said base.

8. The device of claim 6 wherein said base is comprised of a left base, a right base, and a longitudinal slot disposed between said left base and said right base.

9. The device of claim 6 wherein said solid metallic block is made from steel.

* * * * *